United States Patent
Morikawa et al.

(10) Patent No.: US 6,892,681 B2
(45) Date of Patent: May 17, 2005

(54) HEAT STORAGE TANK

(75) Inventors: Toshio Morikawa, Toyota (JP); Shigeo Ito, Anjyo (JP); Yoshio Miyata, Nagoya (JP); Katuhiko Arisawa, Nishikamo-gun (JP); Shigetaka Yoshikawa, Nishikamo-gun (JP); Yoshikazu Shinpo, Nissin (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/807,669

(22) Filed: Mar. 24, 2004

(65) Prior Publication Data
US 2004/0187806 A1 Sep. 30, 2004

(30) Foreign Application Priority Data
Mar. 31, 2003 (JP) ........................................ 2003-093044

(51) Int. Cl.[7] ................................................. F01P 11/02
(52) U.S. Cl. .................................................... 123/41.14
(58) Field of Search ............................. 123/41.14, 41.01

(56) References Cited
U.S. PATENT DOCUMENTS
5,662,072 A * 9/1997 Suzuki et al. ............ 123/41.14

6,477,990 B2    11/2002 Toyoshima et al.
6,718,925 B2 *  4/2004 Toyoshima et al. ...... 123/41.14
6,742,480 B2 *  6/2004 Onimaru et al. ......... 123/41.14

FOREIGN PATENT DOCUMENTS
JP    2000-73764    3/2000
JP    2002-188442   7/2002

* cited by examiner

*Primary Examiner*—Henry C. Yuen
*Assistant Examiner*—Arnold Castro
(74) *Attorney, Agent, or Firm*—Harness, Dickey & Pierce, PLC

(57) ABSTRACT

In the inventive heat storage tank, the welded portion 15 between the inner tank 11 and the outer tank 12 is not encircled by the housing 20 but opens outward in the radial direction of the tank body port 13, and a gap 3 is provided in the axial direction of the tank body port 13 between the welded portion 15 and a par of the housing 20 opposed to the welded portion 15 in the axial direction of the tank body port 13. Also, there is an elastic member 29 between the periphery 18 of the pipe-inserting hole 17 in the flow-straightening member 16 and the flange 26.

11 Claims, 2 Drawing Sheets

HEAT STORAGE TANK

BACKGROUND OF THE INVENTION

1. Field of the Invention

The present invention relates to a heat storage tank and, particularly, to a structure of the heat storage tank.

2. Description of the Related Art

A structure of a heat storage tank has been proposed in Japanese Unexamined Patent Publication Nos. 2002-188442 and 2000-73764. The proposed heat storage tank includes a tank body for storing coolant for an internal combustion engine while maintaining the warmth thereof and a housing provided with a fluid passage communicated with the interior of the tank body, through which the coolant passes. The tank body has an inner tank and an outer tank, and a substantial vacuum is formed between the two. The tank body has an port at the lower end thereof for allowing the coolant in the housing to flow in or out from the tank body. This tank body port is inserted and fitted into the housing so that the housing radially encircles the tank body port from outside.

In the heat storage tank, the inner tank and the outer tank are welded together at the lower end of the tank body port. The welded portion is encircled by the housing from radially outside of the tank body port, and if water enters a gap between the welded portion and the housing, the water is difficult to remove. Also, even if the housing is of a structure that the housing is inserted into the tank body port from the inner circumference side so that the welded portion is not encircled by the housing, water entering the lower end of the welded portion is difficult to remove.

If water, particularly water containing salt is retained, the generation of rust becomes problematic. Even if the inner tank and the outer tank are constructed of stainless steel, the welding material is different from stainless steel. Therefore, if outer water is retained between the welded portion and the housing, the welded portion rusts, and there is a risk in that air penetrates the interface of the welded portion generating rust due to long term use, which may lower the degree of vacuum in a space between the inner and outer tanks and degrade the heat retaining property of the heat storage tank.

SUMMARY OF THE INVENTION

An object of the present invention is to provide a heat storage tank of a structure capable of preventing water from being retained in the welded portion between the inner and outer tanks.

According to one aspect of the present invention, a heat storage tank is provided, comprising a tank body for storing liquid while maintaining the warmth thereof and a housing having a fluid passage communicated with the interior of the tank body and allowing the liquid to pass therethrough, said tank body having an inner tank and an outer tank; said inner and outer tanks being welded together at a port on the tank body to define a sealed space between said inner tank and said outer tank; said sealed space being substantially a vacuum; and part of said housing being inserted and fitted into said tank body port, wherein a welded portion between said inner tank and said outer tank is not encircled by said housing but opens outward in the radial direction of the said tank body port, and a gap extended in the axial direction of said tank body port is defined between the welded portion of said inner tank with said outer tank and a welded portion-opposed part of said housing opposed to said welded portion in the axial direction of said tank body port; said gap having a size substantially incapable of retaining water drops.

In the inventive heat storage tank, as the welded portion of the inner tank with the outer tank is not encircled by the housing but the gap is provided in the axial direction of the tank body port between the welded portion and the part of the housing opposed to the welded portion, even if the welded portion is wetted with water, water flows down by its own weight and is not retained by the welded portion. As a result, the welded portion is prevented from being rusted with retained water, whereby it is possible to avoid lowering the degree of vacuum in the sealed space of the tank body due to the invasion of air from the rusting welded portion as well as the deterioration of the heat retaining property of the heat storage tank caused by the lowering of the degree of vacuum.

Another inventive heat storage tank further comprises a flow-straightening member having a pipe-inserting hole provided in the interior of said tank body to be integral with said tank body, a pipe inserted into said pipe-inserting hole of said flow-straightening member and connected to the fluid passage in said housing, and a flange provided in said pipe to be opposed to the periphery of said pipe-inserting hole in said flow-straightening member in the inserting direction of the pipe; wherein a sealing elastic member provided between the periphery of said pipe-inserting hole in said flow-straightening member and said flange.

According to this heat storage tank, it is possible to solve the problem encountered when the preceding aspect is employed. That is, in the conventional heat storage tank, a flow-straightening member (also referred to as a mixing-preventing plate) is provided for uniformly straightening cold liquid flowing into the interior of the tank body and allowing the same to flow upward from the flow-straightening member so that hot liquid above the flow-straightening member gradually rises while suppressing the mixing of the liquids. The pipe connected to the housing is inserted into a pipe-inserting hole of the flow-straightening member and is provided with a flange opposed to the periphery of the pipe-inserting hole in the flow-straightening member in the inserting direction of the pipe. If the welded portion-opposed part of the housing is away from the welded portion of the tank body as in the preceding aspect, a position of the flange of the pipe is shifted relative to the flow-straightening member on the tank body side, an amount of liquid flowing through an annular gap between the inner periphery of the pipe-inserting hole in the flow-straightening member and the outer circumference of the pipe increases (while this flow is originally suppressed by the sealing action of the flange, an amount of the liquid passing through the annular gap increases due to the positional shift of the flange). Thereby, the cold liquid flows through the annular gap and exits from the upper end opening of the pipe, which then flows out of the heat storage tank through the passage in the pipe, whereby it is impossible to continuously feed the hot liquid.

Contrarily, according to the second aspect, as the elastic member is provided between the periphery of the pipe-inserting hole in the flow-straightening member and the flange of the pipe, the elastic member operates as a seal to suppress the liquid flow passing through the annular gap between the inner edge of the pipe-inserting hole in the flow-straightening member and the outer circumference of the pipe. As a result, even if the flange is shifted, it is possible to cause hot liquid stored in the tank body to continuously flow out of the heat storage tank.

The present invention may be more fully understood from the description of the preferred embodiments of the invention, as set forth below, together with the accompanying drawings.

DESCRIPTION OF THE PREFERRED EMBODIMENTS

Figure 1:
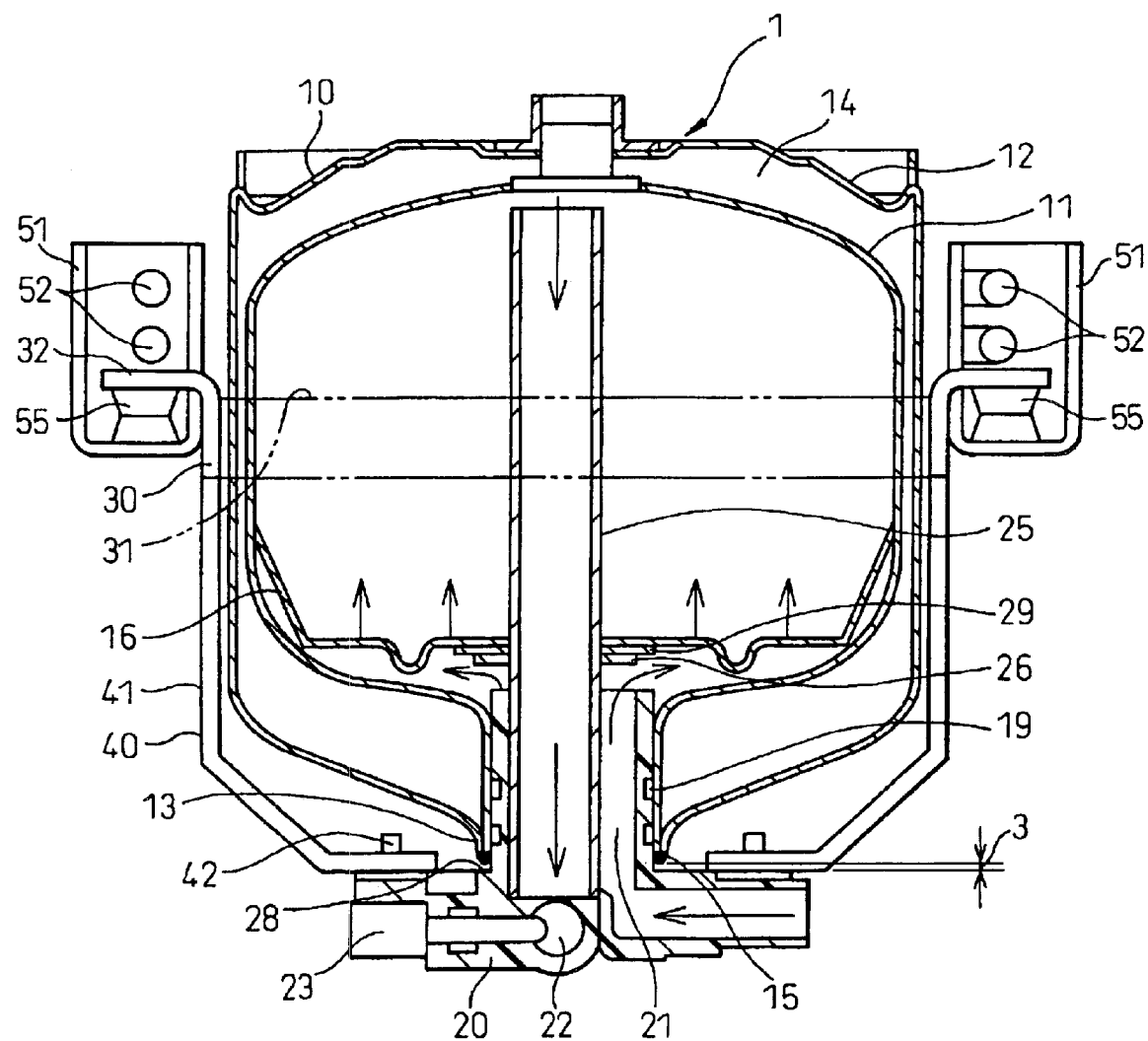
FIG. 1 is a sectional view of a heat storage tank as a whole according to one embodiment of the present invention.

The inventive heat storage tank will be described with reference to FIGS. 1 to 3. In this regard, FIG. 3 is a comparative example not within the scope of the present invention.

The inventive heat storage tank 1 includes a tank body 10 for storing liquid (coolant) while maintaining the warmth thereof, and a housing 20 provided with a fluid passage communicated with the interior of the tank body 10 and allowing the liquid to pass therethrough. The tank body 10 has a tank body port 13, into which is inserted and fitted the housing 20. The tank body port 13 points downward. The tank body 10 has an inner tank 11 and an outer tank 12. The inner and outer tanks 11, 12 are welded together at a lower end of the tank body port 13 (as shown by a reference numeral 15) to define a sealed space 14 between both the inner and outer tanks 11, 12. The sealed space 14 is substantially vacuum. The inner and outer tanks 11, 12 are made, for example, of stainless steel. The sealed space 14 keeps the temperature of hot coolant flowing into the tank body 10 due to the heat insulation effect of vacuum. When the heat storage tank 1 is used for a cooler of an internal combustion engine, the warmed coolant is stored in the inner tank 11 via a fluid passage 21 provided in the housing 20 while being kept in a warm state and flows out from the inner tank 11 during the pre-heating prior to starting the engine.

In the interior of the tank body 10, a flow-straightening member 16 (also referred to as a mixing-preventing plate) is provided in the inner tank 11. The flow-straightening member 16 uniformly straightens cold coolant flowing into the inner tank to turn upward from the flow-straightening member so that hot coolant above the straightening member gradually rises while not being mixed with the cold coolant. One pipe-inserting hole 17 and a number of apertures for uniformly straightening the coolant are provided in the flow-straightening member 16.

A portion of the housing 20 is inserted into the tank body port 13 to fit with the inner circumference of the tank body port 13, and a gap between the tank body port 13 and the housing 20 is sealed with a seal member (O-ring) 19 to prevent liquid leakage. The housing 20 has a portion located outside of the tank body 10, to which is mounted a temperature sensor 23. The portion located outside of the tank body 10 has a welded portion-axially opposed part 28 opposed to the welded portion 15 between the inner and outer tanks 11, 12 in the axial direction of the tank body port 13. The housing 20 is made, for example, of resin.

A pipe 25 is inserted into the housing 20 and fixed thereto. One end of the pipe 25 is connected to the fluid passage 22 of the housing 20, and the other end of the pipe 25 opens to a space of the inner tank 11 filled with the coolant. The coolant in the inner tank 11 flows out through the pipe 25 and the fluid passage 22. The pipe 25 extends through the pipe-inserting hole 17 of the flow-straightening member 16.

A flange 26 extending outward in the radial direction of the pipe 25 is provided midway of the pipe 25. The flange 26 may be formed integral with the pipe 25 or separately from the pipe 25 and fixed thereto to form a part of the pipe 25.

The flange 26 is opposed to the inner periphery 18 of the pipe-inserting hole 17 in the pipe-inserting direction (the pipe-extending direction). As the inner tank 11 moves slightly relative to the pipe 15 and the flange 26 in the pipe-extending direction) when the weight or pressure of the coolant is applied to the inner tank 11, the flange 26 is not fixed to the inner periphery 18 of the pipe-inserting hole 17 in the flow-straightening member 16.

The heat storage tank 1 is attached to a body member of a vehicle by a heat storage tank-mounting member 30 and supported thereon. The heat storage tank-mounting member 30 may be made, for example, of metal. The heat storage tank-mounting member 30 has a band (a band-like bracket) 31 and a bracket 32 welded to the band 31. The band 31 has one cut on the periphery thereof, and is attached to the tank body 10 without being welded by fastening flanges formed at opposite ends of the band with bolts in the circumferential direction of the tank body 10. Vehicle-side brackets 51 are attached to the vehicle body member with bolts 52, and the heat storage tank 1 is attached and fixed to the vehicle-side brackets 51 by supporting the bracket 32 on the vehicle-side brackets 51 via rubber bushes 55.

The housing 20 is held on the tank body 10 via a housing supporting member 40 attached to the heat storage tank-mounting member 30. The housing supporting member 40 has suspension brackets 41 attached to the band 32 at a plurality of positions (for example, four positions) in the peripheral direction of the band. By fastening the suspension brackets 41 to the housing 20 with bolts 42, the housing 20 is held on the tank body 10.

According to the present invention, the welded portion 15 between the inner tank 11 and the outer tank 12 of the tank body 10 is not encircled from outside by the housing 20 in the radial direction but opens outward in the radial direction of the tank body port.

Also, a gap 3 is provided in the axial direction of the tank body port 13 between the welded portion 15 of the inner tank 11 with the outer tank 12 in the tank body 10 and the part opposed to the welded portion 15 of the housing 20 in the axial direction of the tank body port 13 (the welded portion-axially opposed part) 28.

Accordingly, the lower end of the welded portion 15 does not abut the welded portion-axially opposed part 28 in the axial direction of the tank body port 13. In other words, the tank body 10 is apart, upward, at the gap 3, from the housing 20, the pipe 25 fixed to the housing 20 and the flange 26 integral with the pipe 25.

Figure 2:
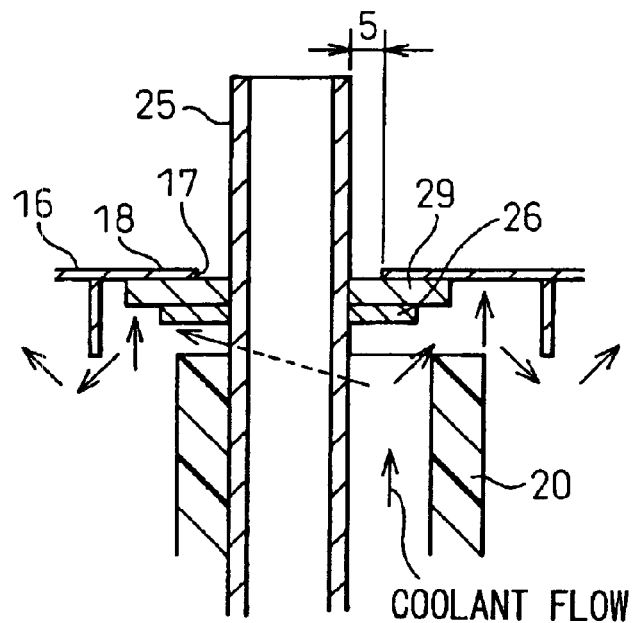
FIG. 2 is an enlarged sectional view of part of the heat storage tank shown in FIG. 1.
Figure 3:
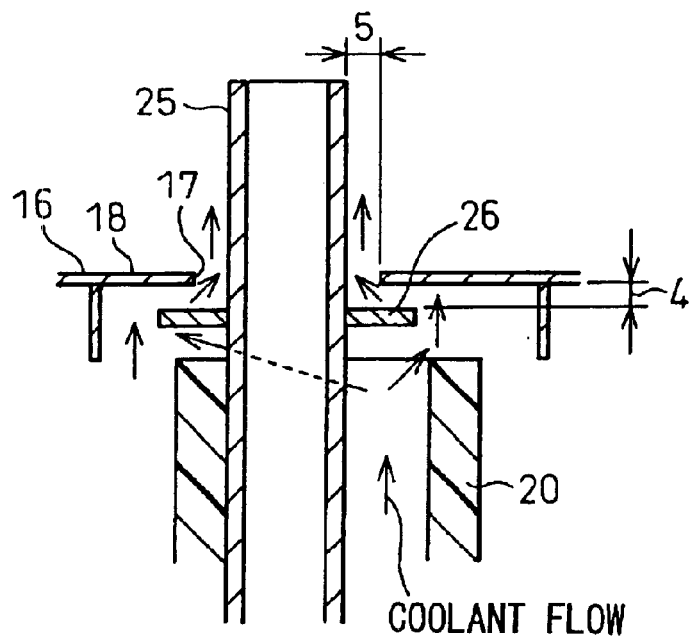
FIG. 3 is a sectional view of part a comparative heat storage tank corresponding to FIG. 2.

As shown in FIG. 2, an elastic member 29 is provided between the inner periphery 18 of the pipe-inserting hole 17 in the flow-straightening member 16 of the tank body 10 and the flange 26 of the pipe 25. As shown in FIG. 3, as a gap 4 is formed between the inner periphery 18 of the pipe-inserting hole 17 in the flow-straightening member 16 of the tank body 10 and the flange 26 of the pipe 25 by the upward movement at the gap 3 of the flow-straightening member 16 in the tank body 10 relative to the flange 26, a radial gap 5 opens between the inner edge of the pipe-inserting hole 17 in the flow-straightening member 16 and the outer circumference of the pipe 25, whereby the coolant tends to flow upward from under side of the flow-straightening member 16. However, as the elastic member 29 is provided, a flow passage formed by the gaps 4 and 5 is blocked by the elastic member 29 and the coolant is prevented from flowing upward from under side of the flow-straightening member 16 as shown in FIG. 2.

The elastic member 29 is nipped between the inner periphery 18 of the pipe-inserting hole 17 in the flow-straightening member 16 and the flange 26 of the pipe 25 and compressed in the thickness direction of the elastic member 29. As the elastic member 29 is elastically deformable, it is possible to absorb the positional error caused in the assembly of the flange 26 and the inner periphery 18 of the pipe-inserting hole 17 in the flow-straightening member 16 or the variation of position due to the deformation of the tank body 10.

The elastic member 29 may be made, for example, of foamed rubber. The foamed rubber has a number of independent pores and prevents the liquid from flowing therethrough, while maintaining the elastic deformation.

Next, the operation of the present invention will be described.

As the welded portion 15 between the inner tank 11 and the outer tank 12 is not encircled with the housing 20, and the gap 3 is provided in the axial direction of the tank body port 13 between the welded portion 15 and the part 28 of the housing 20 opposed to the welded portion 15, even if the welded portion 15 is wetted with water, the water flows down by its own weight and does not remain in the welded portion 15. As a result, the welded portion 15 is prevented from being rusted with the remaining water, whereby it is possible to avoid the invasion of air into the sealed space 14 through the interface of the rusted welded portion 15 or others. Thereby, it is possible to avoid the lowering of the degree of vacuum within the sealed space 14 as well as the deterioration of the heat retaining property of the heat storage tank 10 due to the invasion of air.

As described above, when a structure is employed, in which the welded portion axially-opposed part 28 is apart at the gap 3 from the welded portion 15, a position of the flange 26 of the pipe 25 is shifted relative to the flow-straightening member 16 of the tank body 10 to form the gap 4, whereby the annular gap 5 opens between the inner edge of the pipe-inserting hole 17 in the flow-straightening member 16 and the outer circumference of the pipe 25 opens to increase an amount of the coolant flowing through the annular gap 5. Originally, such a flow ought to be suppressed by the sealing action of the flange 26, but as the gap 4 is formed due to the positional shift of the flange 26, the amount of coolant flowing through the annular gap 5 increases. As a result, cold coolant flows upward from the under side of the flow-straightening member 16 to form a river of the cold coolant which flows from the upper end opening of the pipe 25 out of the heat storage tank 1 through a passage within the pipe 25, whereby hot coolant could not continuously flow out. Consequentially, there is a problem in that the effect, of preheating the engine by hot coolant from the heat storage tank 1 prior to starting the engine to improve the emission suppression performance, does not appear.

However, according to the inventive heat storage tank 1, as the elastic member 29 is provided between the inner periphery 18 of the pipe-inserting hole 17 in the flow-straightening member 16 and the flange 26 of the pipe 25, the elastic member 29 restricts, as a sealing member, the flow of the coolant passing through the annular gap 5 between the inner edge of the pipe-inserting hole 17 in the flow-straightening member 16 and the outer circumference of the pipe 25.

As a result, even if the flange 26 is shifted, it is possible to allow hot coolant stored in the tank body 10 to continuously flow out of the heat storage tank 1, and to effectively preheat the engine and improve the emission performance.

According to the inventive heat storage tank, as the welded portion between the inner and outer tanks is not encircled by the housing, and the gap is provided in the axial direction of the tank body port between the welded portion and the part of the housing opposed to this welded portion, water is not retained in the welded portion. Consequentially, the welded portion is prevented from rusting due to the retained water, whereby it is possible to prevent the degree of vacuum in the sealed space from lowering due to the invasion of air from the rusting welded portion as well as to prevent the heat retaining property of the heat storage tank from deteriorating due to the lowering of the degree of vacuum.

According to the inventive heat storage tank, as the elastic member is provided between the inner periphery of the pipe-inserting hole in the flow-straightening member and the flange of the pipe, the elastic member constitutes a seal member for restricting the liquid flow passing through the annular gap between the inner edge of the pipe-inserting hole in the flow-straightening member and the outer circumference of the pipe. As a result, even if the positional shift occurs in the flange, it is possible to allow hot coolant stored in the tank body to continuously flow out of the heat storage tank.

While the invention has been described by reference to specific embodiments chosen for the purpose of illustration, it should be apparent that numerous modifications could be made thereto, by those skilled in the art, without departing from the basic concept and scope of the invention.

What is claimed is:

1. A heat storage tank comprising a tank body for storing liquid while maintaining the warmth thereof and a housing having a fluid passage communicated with the interior of the tank body and allowing the liquid to pass therethrough, said tank body having an inner tank and an outer tank; said inner and outer tanks being welded together at a tank body port to define a sealed space between said inner tank and said outer tank; said sealed space being substantially a vacuum; and part of said housing being inserted and fitted into said tank body port, wherein a welded portion between said inner tank and said outer tank is not encircled with said housing but opens outward in the radial direction of the said tank body port, and a gap extended in the axial direction of said tank body port is defined between the welded portion of said inner tank with said outer tank and a welded portion-opposed part of said housing opposed to said welded portion in the axial direction of said tank body port; said gap having a size incapable of substantially retaining water drops.

2. A heat storage tank as defined by claim 1, further comprising a flow-straightening member having a pipe-inserting hole provided in the interior of said tank body to be integral with said tank body, a pipe inserted into said pipe-inserting hole of said flow-straightening member and connected to the fluid passage in said housing, and a flange provided in said pipe to be opposed to the periphery of said pipe-inserting hole in said flow-straightening member in the inserting direction of the pipe; wherein a sealing elastic member provided between the periphery of said pipe-inserting hole in said flow-straightening member and said flange.

3. A heat storage tank as defined by claim 2, wherein said tank is adapted so that, when said welded portion-opposed part of said housing moves away from said welded portion of said tank body to enlarge said gap, a position of said flange provided in said pipe is shifted relative to said flow-straightening member to increase an amount of liquid flowing through an annular gap between the inner edge of said pipe-inserting hole in said flow-straightening member and the outer circumference of said pipe, whereby the liquid flows through said annular gap and the fluid in said tank flows from the upper end of said pipe to be out of the tank through a passage within the pipe.

4. A heat storage tank as defined by claim 3, wherein said elastic member is a sealing member for restricting an amount of liquid flowing through said annular gap between the inner edge of said pipe-inserting hole in said flow-straightening member and the outer circumference of said pipe.

5. A heat storage tank as defined by claim 4, wherein said tank body port is mounted in the interior of a vehicle while facing to the ground.

6. A heat storage tank as defined by claim 5, wherein said heat tank is used in a cooling device for an engine, and wherein warmed coolant flows into said inner tank via said fluid passage provided in said housing and stored therein while being warmed and flows out of said inner tank when said engine is preheated.

7. A heat storage tank as defined by claim 6, wherein said flow-straightening member provided in the interior of said tank body includes a mixing-preventing plate for uniformly straightening cold coolant flowing into the tank when said engine is preheated, and causes it to flow upward from said flow-straightening member so that warm coolant above the flow-straightening member gradually rises while the mixing thereof with cold coolant is suppressed, said flow-straightening member being provided with one pipe-inserting hole and a number of apertures for uniformly straightening coolant.

8. A heat storage tank as defined by claim 7, wherein part of said housing is inserted into said tank body port and fitted to its inner circumference, and an O-ring for preventing the liquid leakage is provided between said tank body port and said housing.

9. A heat storage tank as defined by claim 8, wherein one end of said pipe is connected to said fluid passage of said housing and the other end of said pipe opens to a space in said inner tank filled with coolant; the coolant in said inner tank flowing out of the tank through said pipe and said fluid passage, said pipe extending through said pipe-inserting hole in said flow-straightening member, and wherein said flange is provided midway of said pipe and extends outward in the radial direction; said flange being fixed to be integral with said pipe as part of said pipe.

10. A heat storage tank as defined by claim 9, wherein said flange is opposed to the periphery of said pipe-inserting hole in said flow-straightening member in the inserting direction of the pipe, and said flange and the inner circumference of said pipe-inserting hole in said flow-straightening member are not fixed to each other so that said inner tank is slightly shifted relative to said flange in the extending direction of the pipe when the weight or pressure of the coolant is applied to said inner tank.

11. A heat storage tank as defined by claim 10, wherein said heat storage tank is attached to an vehicle body member by a heat storage tank-mounting member having brackets attached to a band; said band having one cut thereon so that said heat storage tank is mounted to said vehicle body member by fastening opposite ends of said band in the circumferential direction of said tank body to said tank body with bolt;

said housing is retained by said tank body via a housing supporting member attached to said heat storage tank-mounting member so that a size of said gap formed between the welded portion of said inner tank with said outer tank and the welded portion-opposed part of said housing is determined, and a size of said annular gap between said flange and the inner edge of said pipe-inserting hole in said flow-straightening member is determined and, in accordance with the size of said annular gap, said elastic member is compressed and elastically deformed in the thickness direction of said elastic member.

* * * * *